US011349560B2

(12) United States Patent
Levy et al.

(10) Patent No.: US 11,349,560 B2
(45) Date of Patent: May 31, 2022

(54) METHOD FOR DETERMINING A MAXIMUM TRANSMISSION POWER OF A NON-GEOSTATIONARY SATELLITE

(71) Applicant: THALES, Courbevoie (FR)

(72) Inventors: Jean-Christophe Levy, Toulouse (FR); Arnaud Guerin, Toulouse (FR); Alexandre Guerin, Toulouse (FR)

(73) Assignee: THALES, Courbevoie (FR)

( * ) Notice: Subject to any disclaimer, the term of this patent is extended or adjusted under 35 U.S.C. 154(b) by 77 days.

(21) Appl. No.: 16/937,041

(22) Filed: Jul. 23, 2020

(65) Prior Publication Data

US 2021/0036771 A1 Feb. 4, 2021

(30) Foreign Application Priority Data

Jul. 31, 2019 (FR) .................................... 1908697

(51) Int. Cl.
  *H04B 7/185* (2006.01)
  *H04B 7/19* (2006.01)
  *H04B 7/195* (2006.01)
(52) U.S. Cl.
  CPC ..... *H04B 7/18543* (2013.01); *H04B 7/18517* (2013.01); *H04B 7/18521* (2013.01); *H04B 7/19* (2013.01); *H04B 7/195* (2013.01)
(58) Field of Classification Search
  None
  See application file for complete search history.

(56) References Cited

U.S. PATENT DOCUMENTS 5,956,619 A * 9/1999 Gallagher .......... H04B 7/18543
  455/12.1
6,011,951 A  1/2000 King
  (Continued)

FOREIGN PATENT DOCUMENTS

EP  848505 A1 * 6/1998 ......... H04B 7/18543
EP  3 182 615 A1  6/2017
  (Continued)

*Primary Examiner* — Tri H Phan
(74) *Attorney, Agent, or Firm* — BakerHostetler

(57) ABSTRACT

A method for determining a maximum transmission power (Pmax, PR, PO) of a non-geostationary satellite (NGSO1, NGSO2) in the direction of a ground station (GSO_SOL), includes the steps of: determining the minimum value of a topocentric angle ($\alpha$NGSO1, $\alpha$NGSO2), formed between the non-geostationary satellite, the ground station and a point of the geostationary arc (ARC_GSO); comparing, in terms of absolute value, the minimum value of the topocentric angle with at least two threshold values ($\alpha$r, $\alpha$o), such that: if it is less than the first threshold ($\alpha$r), defining the maximum transmission power at a first value (PR), if it is between the first threshold and the second threshold ($\alpha$o), defining the maximum transmission power at a second value (PO), greater than the first value, or if it is greater than the second threshold, defining the maximum power at a third value (Pmax), greater than the second value; the maximum transmission power values and the thresholds being determined so as to minimize the deviation between a distribution of the power levels received by the station (GSO_SOL) and added over a time interval and a reference distribution (REF), greater than the distribution of the power levels.

16 Claims, 7 Drawing Sheets

(56) References Cited

U.S. PATENT DOCUMENTS

| | | | | |
|---|---|---|---|---|
| 6,085,067 | A * | 7/2000 | Gallagher | H04W 52/40 |
| | | | | 455/13.1 |
| 6,097,752 | A * | 8/2000 | Wiedeman | H04B 7/18543 |
| | | | | 455/500 |
| 6,701,126 | B1 * | 3/2004 | Draim | B64G 1/244 |
| | | | | 455/13.1 |
| 9,538,538 | B2 * | 1/2017 | Zhang | H04B 7/18543 |
| 9,585,150 | B2 * | 2/2017 | Marsh | H04B 7/18513 |
| 10,390,351 | B2 * | 8/2019 | Faraj | H04W 72/082 |
| 11,101,881 | B2 * | 8/2021 | Jin | H04B 7/1851 |
| 11,166,290 | B2 * | 11/2021 | Levy | H04B 7/18513 |
| 2016/0278063 | A1 | 9/2016 | Zhang et al. | |

FOREIGN PATENT DOCUMENTS

| | | |
|---|---|---|
| WO | 02/41093 A2 | 5/2002 |
| WO | 2017/177343 A1 | 10/2017 |

* cited by examiner

METHOD FOR DETERMINING A MAXIMUM TRANSMISSION POWER OF A NON-GEOSTATIONARY SATELLITE

CROSS-REFERENCE TO RELATED APPLICATIONS

This application claims priority to foreign French patent application No. FR 1908697, filed on Jul. 31, 2019, the disclosure of which is incorporated by reference in its entirety.

FIELD OF THE INVENTION

The invention relates to a computer-implemented method for determining a maximum transmission power of a satellite of a constellation of non-geostationary satellites in order to comply with a regulatory interference power level with respect to geostationary satellites.

BACKGROUND

A topocentric angle is an angle formed by the respective directions between a point of the Earth and a non-geostationary satellite and the point on Earth and a geostationary satellite, in order words an angle formed from a point on Earth between a non-geostationary satellite and an geostationary satellite.

The angle $\alpha$ is the minimum topocentric angle for a non-geostationary satellite and a given point on Earth. In other words, the angle $\alpha$ is obtained for the geostationary satellite that is located at the position on the geostationary arc that minimizes the topocentric angle.

The maximum transmission power is determined depending on the value of the angle $\alpha$ for a geostationary ground station at a point of the Earth and for a non-geostationary satellite of the constellation transmitting to this station, so as to comply with a regulatory interference power level with respect to geostationary satellites.

In order to protect the transmission and reception of signals by geostationary satellites, it is necessary to verify that the satellites of a non-geostationary constellation do not interfere with geostationary satellites and their ground stations. To this end, international law imposes, in some frequency bands, constraints on jamming levels transmitted by satellites of non-geostationary constellations, which may result in constraints on the transmission power of these non-geostationary constellations.

In addition, the greater the level of jamming, the less common it is allowed to be, and international law therefore expresses these constraints in the form of statistical jamming power limits. Now, limiting the jamming level is tantamount to limiting the transmission power of the satellites of the non-geostationary constellation and is therefore tantamount to limiting the capacity of the constellation.

In order to limit the constraint on the capacity of the constellation, it is therefore important to determine the operational power constraints as precisely as possible in order to minimize the impact on the capacity of the constellation while still protecting geostationary systems.

At present, this problem is worded as follows: given a power radiated by a non-geostationary satellite belonging to a non-geostationary constellation, what does the minimum angular spacing between the satellites of the constellation and the geostationary satellites have to be in order to comply with the required jamming level.

[FIG. 1] describes this problem. A ground station GSO_SOL receives signals from a geostationary satellite GSO. A non-geostationary satellite NGSO, moving over an orbit ORB_NGSO of a constellation of non-geostationary satellites, may interfere with these signals and jam them. It is therefore sought to ascertain the dimensions of an area ZNA, a non-addressable area, in which the satellite NGSO is able to transmit at reduced power to the ground station GSO_SOL. At present, the definition of this area ZNA is somewhat conservative, and the transmission power, to the ground station GSO_SOL, of the satellite NGSO in the area ZNA is highly limited.

SUMMARY OF THE INVENTION

The invention aims to overcome the abovementioned drawbacks of the prior art, and aims more particularly to calculate the maximum transmission powers of the constellation of non-geostationary satellites in order to minimize the impact on its capacity and to protect geostationary systems.

One subject of the invention is therefore a computer-implemented method for determining a maximum transmission power of a non-geostationary satellite in the direction of a ground station, the method comprising the steps of:
determining the minimum value of a topocentric angle, formed between the direction between the non-geostationary satellite and the ground station, on the one hand, and between the ground station and a point of the geostationary arc corresponding to the orbit of a constellation of geostationary satellites, on the other hand;
comparing, in terms of absolute value, the minimum value of the topocentric angle with at least two threshold values, such that:
if said minimum value is less, in terms of absolute value, than the first threshold, defining the maximum transmission power of the non-geostationary satellite at a first value,
if said minimum value, in terms of absolute value, is between the first threshold and the second threshold, defining the maximum transmission power of the non-geostationary satellite at a second value, greater than the first value,
if said minimum value is greater, in terms of absolute value, than the second threshold, defining the maximum transmission power of the non-geostationary satellite at a third value, greater than the second value;
the first, the second and the third maximum transmission power value, the first and the second threshold being determined so as to minimize the deviation between a distribution of the power levels received by the ground station and added over a time interval and a reference distribution, the distribution of the received and added power levels being less than the reference distribution.

According to some embodiments:
The thresholds and the power values are determined through the following steps:
1) For a value of the first angular threshold and for a value of the second angular threshold: simulating the power levels received by the ground station and added over a time interval, comparing a distribution of the added power levels with the reference distribution and determining the value of the third power threshold so as to minimize the deviation between the reference distribution and the distribution of the added power levels;
2) For the same first angular threshold value in step 1) and for the third power threshold value determined in step 1): simulating, for a plurality of second angular threshold values, power levels received by the station and added over a time interval, comparing a distribution of the added power levels with the reference distribution for each second angular threshold value and determining the value of the second angular threshold from among the simulated values so as to minimize the deviation between the reference distribution and the distribution of the added power levels, and such that the difference between the second angular threshold and the first angular threshold is minimal.

Steps 1) and 2) are repeated successively, the value of the first angular threshold being different between each repetition, so as to obtain a triplet of values of the first threshold, of the second threshold and of the third power value at each repetition.

The method comprises the following step executed after the repetition of steps 1) and 2):

3) Determining the triplet of values of the first threshold, of the second threshold and of the third power value from among the triplets obtained through the repetitions of steps 1) and 2) so as to comply with a criterion of a minimum quality of service provided by a non-geostationary system to which the non-geostationary satellite belongs.

Step 3) comprises, for each triplet of values and for each instant of a time interval, determining non-geostationary satellites having a minimum topocentric angle value greater than the first threshold of the triplet, and simulating the powers transmitted by these determined satellites to the ground station and the powers received by the ground station in order to determine a throughput received by the ground station at each instant and for each triplet so as to select one of the triplets of values.

The determined triplet of values is the one in which the sum of the throughputs at each instant is highest.

The determined triplet of values is the one in which the throughput is at a maximum for a predetermined proportion of the time interval.

The method comprises the following steps performed after step 3):

4) For each instant of the time interval, selecting non-geostationary satellites having a minimum topocentric angle value greater than the first angular threshold;

5) Simulating the power levels transmitted by the satellites selected in step 4) and received by the ground station added over the time interval;

6) Identifying the instants of the time interval and adjusting the third maximum power value so as to minimize the deviation between a distribution of the power levels received by the ground station and added over the time interval and the reference distribution, the reference distribution being greater than the added power levels.

The method also comprises a refinement step comprising determining additional angular thresholds and power thresholds so as to reduce the deviation between the added power levels in step 3) and the reference level, the added power levels being less than the reference level.

The method is implemented for a plurality of ground station position hypotheses.

The method also comprises selecting at least one satellite of a constellation of non-geostationary satellites at each instant, the power levels received by the station resulting from signals transmitted by the selected satellites; and in this case the selected satellite may be the one having the highest power received by the ground station or the one located at the nadir of the ground station.

The method comprises a step of correcting the first, the second and the third maximum transmission power values of a non-geostationary satellite of the constellation, located at a point different from the nadir of the ground station, such that the power received by the ground station from this satellite of the constellation is equal to the power received by the ground station from the selected satellite located at the nadir.

Another subject of the invention is a computer program comprising instructions for executing the method for determining a maximum transmission power of a non-geostationary satellite according to the invention when the program is executed by a processor.

Yet another subject of the invention is a recording medium able to be read by a processor and on which there is recorded a program comprising instructions for executing the method for determining a maximum transmission power of a non-geostationary satellite according to the invention when the program is executed by a processor.

BRIEF DESCRIPTION OF THE DRAWINGS

Other features, details and advantages of the invention will become apparent upon reading the description provided with reference to the appended drawings, which are given by way of example and in which, respectively.

DETAILED DESCRIPTION

Figure 1:
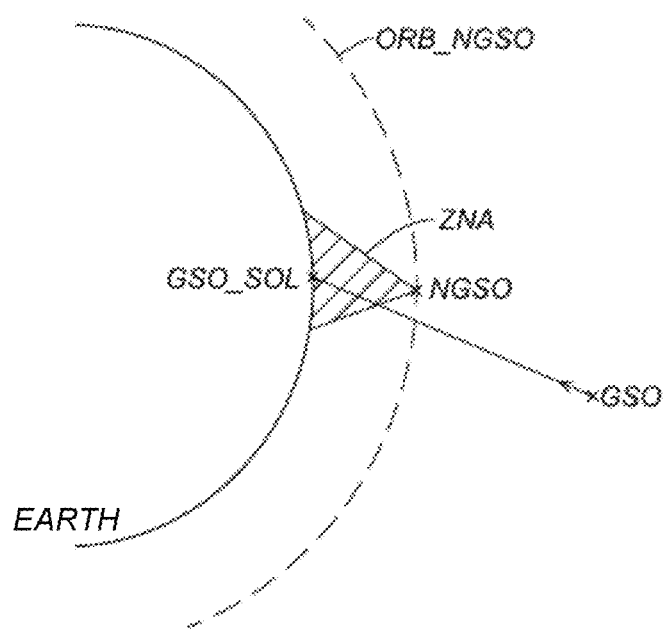
FIG. 1, already described, shows a diagram showing the current constraints on constellations of non-geostationary satellites according to the invention.
Figure 2:
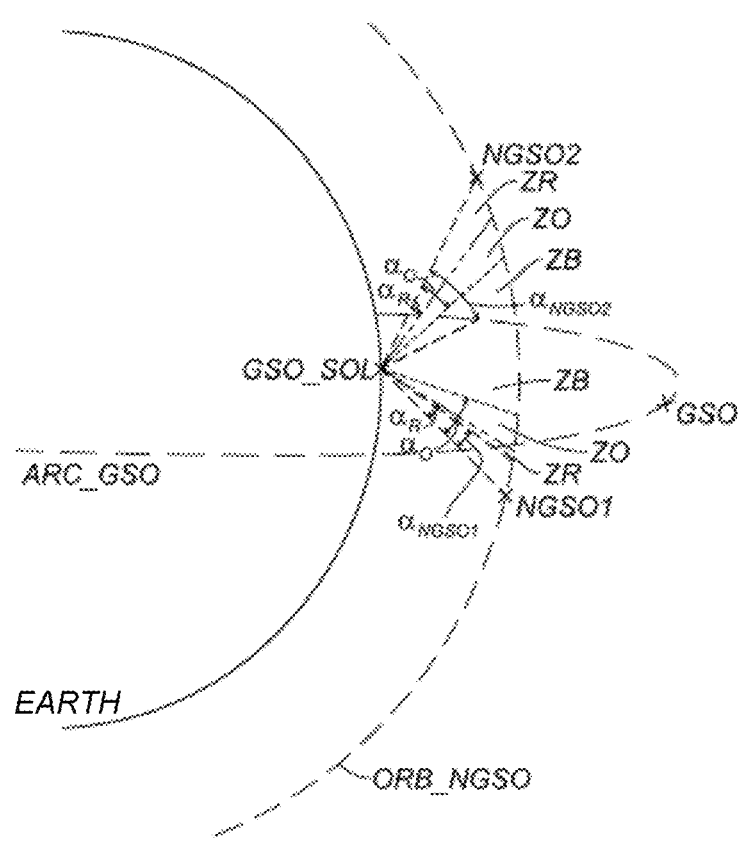
FIG. 2 shows a diagram of the principle of the method according to the invention.

[FIG. 2] shows a diagram of the application of the method according to the invention. The aim of the method is to define areas (ZO, ZR, ZB) in which the transmission power to the ground station GSO_SOL from a satellite NGSO1 or NGSO2 is limited, the satellites NGSO1 and NGSO2 belonging to a constellation of non-geostationary satellites having a defined orbit ORB_NGSO and transmitting to a point on Earth GSO_SOL, and also to define maximum transmission power values within these areas.

Defining these areas makes it possible to minimize interference between satellites of the constellation NGSO and geostationary systems comprising geostationary satellites GSO of the geostationary arc ARC_GSO and ground stations GSO_SOL, and more particularly to minimize interference between the satellites of the constellation NGSO1 and NGSO2 transmitting to the ground station GSO_SOL and the geostationary satellites GSO linked to this same ground station GSO_SOL.

To this end, it is assumed that the constellation of non-geostationary satellites transmits to a point on Earth where a geostationary ground station GSO_SOL is located, and the minimum topocentric angle α is defined for this point on Earth and the non-geostationary satellites of the constellation. The topocentric angle is the angle formed from a point on Earth and between a non-geostationary satellite and a geostationary satellite. The angle α is the minimum topocentric angle from among all of the topocentric angles defined with respect to all of the geostationary satellites of the geostationary arc ARC_GSO.

For example, in FIG. 2, for the non-geostationary satellite NGSO1 transmitting to the ground station GSO_SOL, the minimum topocentric angle α is αNGSO1, whereas, for the non-geostationary satellite NGSO2 transmitting to the same ground station GSO_SOL, the minimum topocentric angle α is αNGSO2.

The areas ZR, ZO and ZB defined by the method are angular areas defined as a function of angular threshold values αr and αo. The angular threshold values αr and αo represent minimum topocentric angles α. The angular thresholds αr (first angular threshold) and αo (second angular threshold) make it possible to define the first area ZR, for which the minimum topocentric angle α, formed by the non-geostationary satellite and a ground station with respect to the geostationary arc is less than αr in terms of absolute value; the second area ZO, for which this same angle α is between αr and αo in terms of absolute value and the third area ZB, for which this same angle α is greater than αo in terms of absolute value.

In each of the areas ZR, ZO and ZB, the transmission power of the non-geostationary satellites, more precisely the equivalent isotropic radiated power (EIRP) in the direction of the ground station GSO_SOL, is limited to a particular power value. In the first area ZR, the maximum transmission power is limited to PR, in the second area ZO, the maximum transmission power is limited to PO, greater than PR, and in the third area ZB, the maximum transmission power is limited to Pmax, greater than PO.

FIG. 2 thus shows the angular thresholds αr and αo around two non-geostationary satellites NGSO1 and NGSO2. The minimum topocentric angle values αNGSO1 and αNGSO2 are compared with these angular thresholds in order to determine the area in which the non-geostationary satellite is located and therefore the maximum power at which it is able to transmit in the direction of the ground station GSO_SOL.

For the satellite NGSO1, its minimum topocentric angle αNGSO1 is less than the first threshold αr, and it is therefore located in the first area ZR and its transmission power is limited to PR.

For the satellite NGSO2, its minimum topocentric angle αNGSO2 is greater than the second threshold αo, and it is therefore located in the third area ZB and its transmission power is limited to Pmax.

Figure 3:
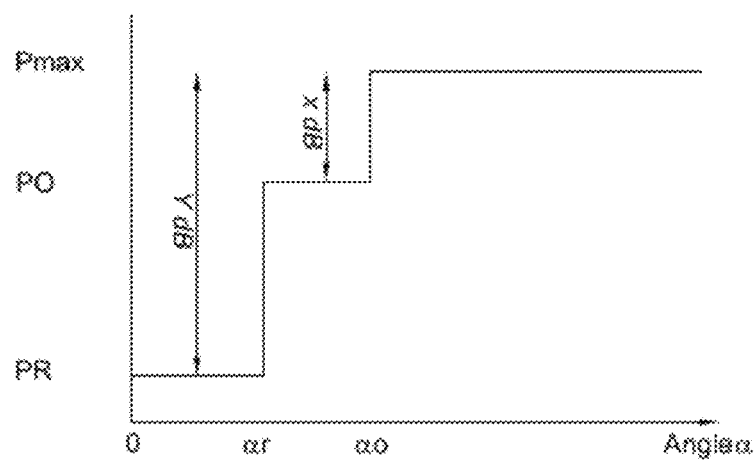
FIG. 3 shows a figure showing a transmission power profile obtained by the invention.

A graphical exemplary illustration of the maximum power as a function of the minimum topocentric angle α is given in FIG. 3. FIG. 3 shows the maximum transmission power of a non-geostationary satellite transmitting jamming signals in the direction of a geostationary ground station. The maximum power is a function of the angle α defined for the geostationary ground station and the non-geostationary satellite of the constellation under consideration. The various angular thresholds αr, αo associated with the power thresholds PR, PO and Pmax are shown in FIG. 3. The angular thresholds αr and αo make it possible to define the areas ZR, ZO and ZB in which the transmission power of the non-geostationary satellite is limited by power thresholds PR, PO and Pmax.

Pmax is defined according to the constraints with regard to the geostationary system by virtue of the method according to the invention. The difference between Pmax and PO, shown in FIG. 3 by X dB, represents the maximum EIRP power decrease that the non-geostationary system is able to withstand in order to guarantee service to a user on Earth. The difference between Pmax and PR, shown in FIG. 3 by Y dB, represents the EIRP power decrease of the non-geostationary satellite linked to the rejection of its antenna.

Figure 4:
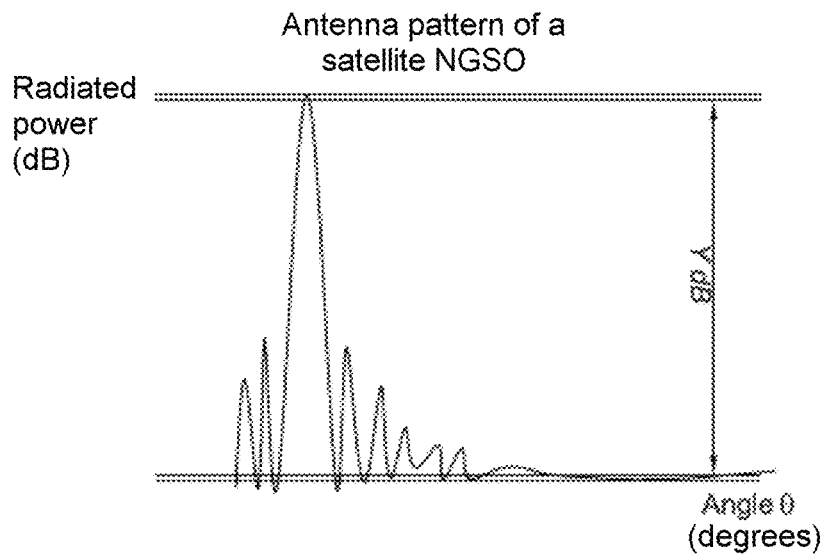
FIG. 4 shows an antenna pattern of a non-geostationary satellite for determining the third power threshold of the profile determined by the method according to the invention.

[FIG. 4] shows an antenna pattern of a non-geostationary satellite with an angle θ in degrees on the abscissa and a radiated normalized power in decibels dB on the ordinate. This makes it possible to determine the difference Y dB, and therefore the first threshold value PR. On the antenna pattern, the difference between the main lobe and the floor value is highlighted, shown in FIG. 4 by Y dB. The value PR will then be equal to the difference between Pmax and Y, Y being expressed in decibels.

Defining these maximum power thresholds PR, PO and Pmax as a function of angular thresholds αr and αo thus makes it possible to minimize interference between a non-geostationary satellite transmitting to a point on Earth on the link between a ground station situated at this point on Earth and a geostationary satellite.

Once the power thresholds PR, PO, Pmax and the angular thresholds αr and αo have been determined, the areas that are determined, for a given point on Earth, are the same for each non-geostationary satellite of the constellation of non-geostationary satellites transmitting to this point on Earth. For a given point on Earth, the same definition of areas (αr and αo) with regard to this point will be used for all of the satellites of the constellation transmitting to this point. Since these areas are defined for a single point on Earth, it will therefore be necessary to determine new areas for another point on Earth.

Depending on the system type, isoFLUX or isoEIRP, it will be necessary to adapt the maximum power values Pmax, PO and PR for each satellite of the non-geostationary constellation.

An isoEIRP system is a system in which all of the non-geostationary satellites of the constellation, which transmit in the direction of the same ground station, are configured so as to have the same transmission power to this ground station.

An isoFLUX system is a system in which all of the non-geostationary satellites of the constellation, which transmit in the direction of the same ground station, are configured so as to have a transmission power such that the power received by this ground station is the same for each of these satellites.

Thus, for an isoEIRP system and for a given point on Earth, the same maximum powers (Pmax, PO and PR) will also be used for all of the satellites of the constellation transmitting to this point on Earth; whereas, for an isoFLUX system and for a point on Earth, the maximum powers determined by the method (Pmax, PO and PR) correspond to the maximum powers of the satellite of the constellation located at the nadir of this point on Earth. Another satellite of the constellation, different from the satellite at the nadir of the point on Earth, has maximum power values (Pmax, PO and PR) adjusted by +x dB, where x corresponds to the propagation loss difference between this satellite and the satellite at the nadir, and the propagation loss corresponds to the power attenuation between the power received by the ground station coming from the satellite at the nadir and another satellite of the constellation. The power attenuation is due to the path difference between the satellite at the nadir of the station and this other satellite of the constellation.

Figure 5:
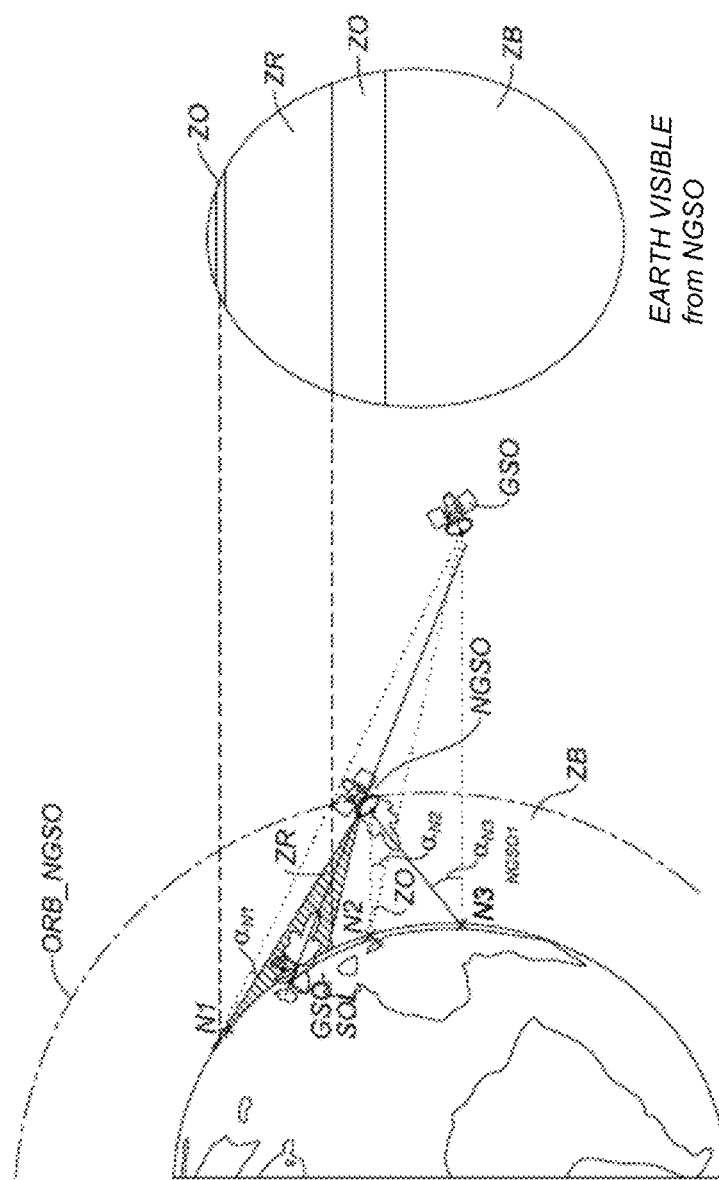
FIG. 5 shows an illustration of the transmission areas from the point of view of a non-geostationary satellite, the areas being determined by the method according to the invention.

[FIG. 5] shows the areas ZR, ZO and ZB from the point of view of a non-geostationary satellite with respect to a plurality of points on Earth to which it transmits. For a fixed non-geostationary satellite NGSO, it is possible to define these same areas ZR, ZO and ZB with respect to this satellite transmitting to Earth.

If the satellite NGSO transmits in the direction of the point N1, the minimum topocentric angle $\alpha N1$ is less than the first threshold, and therefore to this point N1, and the satellite NGSO is in the first area ZR.

If the satellite NGSO transmits in the direction of the ground station GSO_SOL, the minimum topocentric angle is virtually zero (since the satellite NGSO, the ground station and a point of the geostationary arc are aligned), and it is therefore always less than the first threshold $\alpha r$, and the satellite NGSO is always in the first area ZR.

If the satellite NGSO transmits in the direction of the point N2, the minimum topocentric angle $\alpha N2$ is greater than the first threshold $\alpha r$ but is less than the second threshold $\alpha o$, and the satellite NGSO is therefore in the second area ZO.

Lastly, if the satellite NGSO transmits in the direction of the point N3, the minimum topocentric angle $\alpha N3$ is greater than the second threshold $\alpha o$, and the satellite NGSO is therefore in the third area ZB.

The Earth visible from the satellite NGSO may be represented as an ellipse divided into strips in which each of the strips represents an area ZR, ZO or ZB in which the satellite NGSO is able to transmit with a defined maximum transmission power value.

Figure 6:
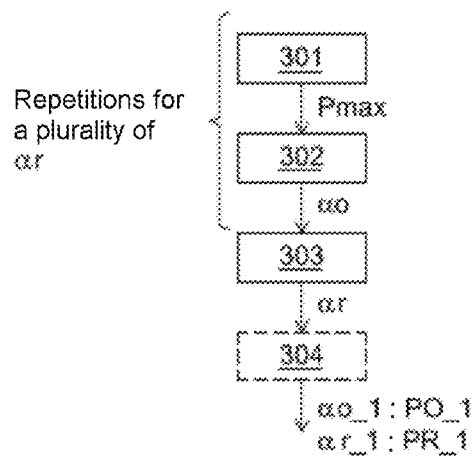
FIG. 6 shows a diagram of the steps of the method according to a first embodiment of the invention.

[FIG. 6] shows a diagram of the steps of the method according to a first embodiment of the invention.

In a first step 1) 301, the value of the third power threshold Pmax will be determined. To this end, a value of the first angular threshold $\alpha r$ and a value of the second angular threshold $\alpha o$ are set arbitrarily. With these set values, simulations are performed of the power level received by the ground station for a plurality of successive instants of a time interval from a non-geostationary satellite of the constellation. Next, the distribution of the power levels received by the station and added in the time interval is determined, thereby giving a curve representing the distribution of the added power levels received by the station, with the power levels received by the station over time on the abscissa and a time percentage, the percentage 100% representing the full time interval, on the ordinate. This distribution is then compared with a reference distribution in order to determine the value of the third power threshold Pmax so as to minimize the deviation between the reference distribution and the distribution of the added power levels, the distribution of the added power levels remaining less than the reference distribution. One example of this comparison with the reference distribution is described with reference to FIG. 7a.

The reference distribution is defined by a norm such as an acceptable threshold so as not to interfere on the link between the ground station and the geostationary satellite, the aim of the invention being to get as close as possible to this acceptable threshold.

In a second step 2) of the method 302, the value of the second angular threshold $\alpha o$ will be determined. To this end, the value of the first angular threshold $\alpha r$, which will be equal to the same value as the one set in step 1), is set, and the value of the third power threshold Pmax is set to the value determined in step 1). With these values, simulations are performed, for a plurality of values of the second angular threshold $\alpha o$, of the power level received by the ground station at the same instants as in step 1). The distribution of the power levels received by the point on Earth and added in the time interval for each second angular threshold value is then determined. These added power level distributions are then compared with the reference distribution in order to determine the second angular threshold value $\alpha o$ that makes it possible to minimize the difference $\alpha o - \alpha r$ and that still makes it possible to minimize the deviation between the reference distribution and the distributions of the added power levels. The second angular threshold $\alpha o$ will then be equal to this value.

These two steps are performed for a single first angular threshold value $\alpha r$. In order to determine the value of the first angular threshold $\alpha r$, steps 1) and 2) are repeated while modifying the value of $\alpha r$ at each repetition. By repeating these steps 1) and 2) for various values of $\alpha r$, as many triplets ($\alpha r$, $\alpha o$, Pmax) are obtained as there were repetitions of steps 1) and 2).

Next, in a third step 3) of the method 303, it will be sought to determine the value of the first angular threshold $\alpha r$, which will be equal to one of the values used to repeat steps 1) and 2); in other words, it will be sought to determine which triplet ($\alpha r$, $\alpha o$, Pmax) from among the triplets obtained through the repetitions of steps 1) and 2) is the most beneficial for the constellation.

To this end, it is possible to study for example the quality of service of the constellation of non-geostationary satellites, in particular the number of bits per second per hertz that it is possible to send to ground stations, and the value of $\alpha r$ will be determined so as to comply with a quality of service criterion. This step is described with reference to FIG. 8.

Figure 8:
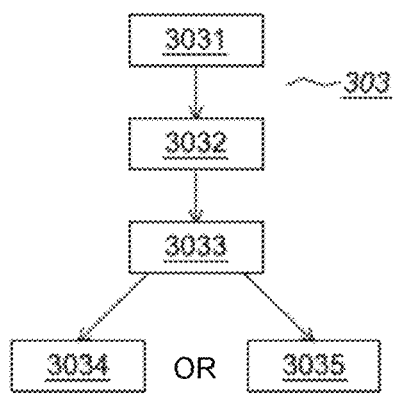
FIG. 8 shows a diagram describing the implementation of the third step of the method according to one embodiment of the invention.

[FIG. 8] shows a diagram describing the implementation of step 3) of the method according to one embodiment of the invention.

In this example, the triplet ($\alpha r$, $\alpha o$, Pmax) and therefore the value of the first angular threshold $\alpha r$ are determined by calculating, through simulation, the capacity of the constellation of non-geostationary satellites with regard to the ground station for a plurality of instants.

In a first step 3031, non-geostationary satellites are selected that are able to transmit to the ground station at each instant of a time interval for each triplet of values ($\alpha r$, $\alpha o$, Pmax). The satellites that are selected are those that are capable of providing a service in the direction of the ground station, therefore the non-geostationary satellites having an angle alpha $\alpha$ greater than the value $\alpha r$ of the triplet.

At the end of the first step, there is therefore a set of non-geostationary satellites selected for each triplet ($\alpha r$, $\alpha o$, Pmax).

Next, in a second step 3032, the power levels received by the station and the power levels transmitted by the selected non-geostationary satellites for each instant and for each triplet ($\alpha r$, $\alpha o$, Pmax) are determined through simulation, in the knowledge that the selected satellites will each have a maximum transmission power equal to PO or Pmax depending on their minimum topocentric angle value (less than or equal to $\alpha o$).

Next, in the following step 3033, the capacity of the constellation is calculated for each instant and for each triplet ($\alpha r$, $\alpha o$, Pmax); in other words, the spectral efficiency received by the ground station is calculated for each instant and for each triplet (αr, αo, Pmax), the spectral efficiency being expressed in bits/s/Hz. Instead of spectral efficiency, it is also possible to calculate the throughput received by the ground station, which is expressed in bits/s.

With these capacity values for each instant, it is possible to determine the triplet (αr, αo, Pmax) and therefore the value of αr in several ways. Steps 3034 and 3035 describe two of these ways.

Following step 3033, it is possible to add all of the capacity values obtained at the various instants for each triplet (αr, αo, Pmax) 3034, and the triplet (αr, αo, Pmax) giving the value of αr, which will be used by the method, is the one that gives the highest sum of the capacities.

Following step 3033, instead of step 3034, it is possible to calculate the added capacities over the time interval for each triplet (αr, αo, Pmax) 3035. The triplet (αr, αo, Pmax) giving the value of αr, which will be used by the method, is the one that gives the greatest capacity for a certain percentage of time, for example for 95% of the time.

An additional step 4) (304) of refining the maximum power limits as a function of the angle α may also be present. This consists in defining additional power threshold values and additional angular thresholds so as to reduce the deviation between the reference distribution and the distribution of the power levels received and added by the ground station.

The aim of this refinement step is to add power thresholds and angular thresholds between the thresholds that have already been determined so as to minimize interference of the non-geostationary satellite to a point on Earth while still having a high transmission power. Specifically, when approaching an angular threshold, the associated power threshold may be slightly exceeded since, with an angle equal to this angular threshold, there is a transition to a power limit equal to another, higher threshold. It is therefore sought in this step to relax the power level constraints within an area by virtue of determining these additional thresholds.

Thus, in this step, it is sought to determine at least one power threshold and one intermediate angular threshold before the first angular threshold and between the first and second angular threshold. As for the previous steps, to achieve this, an angular threshold value αr_1 associated with a power threshold PR_1 is varied, αr_1 being less than αr and PR_1 being greater than PR and less than the power threshold PO, so as to get as close as possible to the norm. It is also possible to determine an angular threshold value αo_1 associated with a power threshold PO_1 where αo_1 is greater than αr and less than αo and PO_1 is greater than PO and less than Pmax.

As above, this is achieved by performing simulations of the power levels received by the point on Earth at a plurality of instants in the time interval by taking the values of Pmax, αr and αo determined in the previous steps and by varying the values of the additional thresholds. Next, the power levels received and added in the time interval for each of the simulated additional threshold values are determined. They are compared with the reference level, and the additional threshold values that make it possible to minimize the difference between the reference level and the added levels while still keeping it positive are chosen.

Steps 1) to 4) are performed for a geostationary ground station at a point on Earth.

According to another embodiment, these steps are performed for a plurality of geostationary ground stations representing N points on Earth, N being an integer. Steps 1) to 4) are therefore repeated N times. Each time the point on Earth varies, the areas ZR, ZO and ZB and their angular thresholds αr and αo and their power limit values PR, PO and Pmax are defined by the method again. Specifically, for one and the same geostationary satellite under consideration, the minimum topocentric angle α varies when the point on Earth varies, as shown in FIG. 5. For N points on Earth under consideration, the method is therefore repeated N times.

The method of the invention may thus also be implemented so as to minimize interference between satellites of a constellation of non-geostationary satellites and a geostationary system comprising all of the geostationary satellites of the geostationary arc and all of the geostationary ground stations.

According to another embodiment, the simulations performed in steps 1) and 2) do not determine the power levels received by the ground station and transmitted by a single non-geostationary satellite, but rather the power levels received by the ground station and transmitted by a plurality of non-geostationary satellites. This makes it possible to take into account cases in which a plurality of non-geostationary satellites transmit in the direction of one and the same point on Earth.

The limit power levels PR, PO and Pmax then take into account all of the signal transmissions of the non-geostationary constellation in the direction of this point on Earth and are the same for each satellite of the constellation transmitting to this point.

According to another embodiment, step 1) also comprises selecting the satellite or satellites of the non-geostationary constellation, used to implement the method, notably for simulations of the power levels received by the ground station, for each instant of the time interval. The power levels simulated and received by the point on Earth then result only from these selected satellites. This makes it possible to select the most relevant non-geostationary satellites to perform these simulations and thus limit computing times.

The satellites that are selected will be for example those having the highest power level received by the point on Earth. According to another example, they may be the satellites having a minimum topocentric angle less than the first angular threshold αr set for step 1) of the method.

It is important to retain the same selection criterion between each repetition of steps 1) and 2), that is to say between each variation of the angle αr.

After having determined the values of the angular thresholds αr and αo as well as the maximum transmission powers associated with the areas for a point on Earth to which a satellite of the constellation transmits, it is possible to determine the maximum transmission power of this satellite. To this end, the minimum value of the topocentric angle formed by this point on Earth, the satellite of the constellation transmitting to this point and a point of the geostationary arc is determined. Next, this minimum value is compared with the angular thresholds: if the minimum value of the topocentric angle is less than αr, then the satellite will have a transmission power limited to PR, if the minimum value of the topocentric angle is between αr and αo, then the satellite will have a transmission power limited to PO, and if the minimum value of the topocentric angle is greater than Pmax, then the satellite will have a transmission power limited to Pmax.

If a plurality of satellites of the non-geostationary constellation transmit to the same point on Earth, this is applied to each satellite. Each satellite will thus have its own transmission power limit depending on its minimum topocentric angle value.

According to another embodiment of the invention, the method also comprises additional steps performed after step 3) that make it possible to adjust the maximum transmission power values to an operational situation.

These additional steps comprise selecting, in a step 4), for each instant of the time interval, non-geostationary satellites having a minimum topocentric angle value $\alpha$ greater than the first angular threshold $\alpha r$ defined in step 3) of the method with respect to the ground station under consideration and the geostationary arc. The selected satellites therefore have a transmission power equal to PO if their minimum topocentric angle $\alpha$ is less than the second threshold $\alpha o$ or a transmission power equal to Pmax if their minimum topocentric angle $\alpha$ is greater than the second threshold $\alpha o$.

In a following step 5), the power levels transmitted by these selected satellites and received by the ground station added over the time interval are simulated.

Next, in a step 6), instants of the time interval are identified and the third maximum power value Pmax of these instants is adjusted so as to minimize the deviation between a distribution of the power levels received by the ground station and added over the time interval and the reference distribution REF, the reference distribution being greater than the added power levels.

Figure 7A:
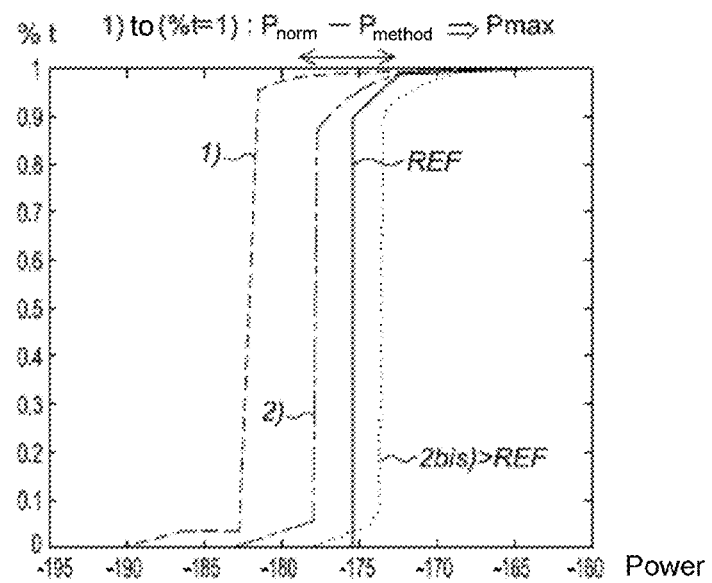
FIG. 7*a* shows a diagram describing the implementation of steps 1) and 2) of the method according to the same embodiment.

[FIG. 7a] shows an example of the comparison of the distribution of the added power levels received by the ground station, resulting from the simulations of steps 1) and 2), with the reference distribution (REF). The power levels received by the station are shown on the abscissa and the time percentage is shown on the ordinate. The reference distribution REF gives the authorized limit values for the power received by the station from the non-geostationary satellite as a function of time. For example, the satellite is never allowed to transmit with a received power level on the ground beyond $-160$ dBW/m$^2$/40 kHz, while 50% of the time it has to have a power level less than $-175$ dBW/m$^2$/40 kHz.

The distribution of the added power levels obtained in step 1) is represented by the curve 1). By comparing this distribution 1) with the reference REF, it is possible to determine the value of the third power threshold Pmax. The aim is to move the curve resulting from the simulations in translation towards the reference curve, while still remaining below this reference. The translation that is performed makes it possible to determine the value of Pmax.

After having determined the threshold value Pmax, distribution 2) of added power levels is obtained. It is noted that this distribution is always below the reference REF and that it may be possible to get slightly closer thereto. The aim of step 2) is therefore to vary the values of the second angular threshold $\alpha o$ in order to get closer to the reference distribution REF. Curves 2) and 2bis) show two distributions of power levels received by the ground station and added over the time interval for two different values of $\alpha o$. It is noted that the distribution 2bis) has power levels greater than the reference REF, and therefore the angular threshold value giving this distribution 2bis) is eliminated.

Figure 7B:
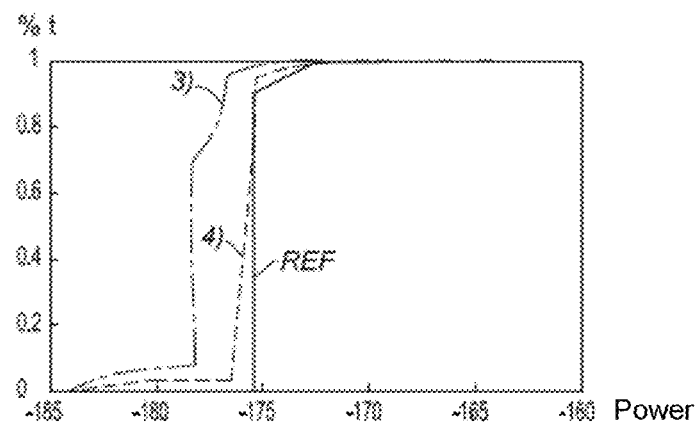
FIG. 7*b* shows a diagram describing the implementation of step 4) of the method.

[FIG. 7b] shows an example of a comparison of the distribution of the power levels received by the station and added over time with the reference distribution REF for refinement step 4). The power levels received by the ground station are shown on the abscissa and the time percentage is shown on the ordinate. As in the previous steps, it is sought to get close to the reference distribution REF. In step 4), additional angular and power threshold values are introduced that make it possible to relax the constraints on the power levels at the edge of the areas ZR and ZO, and thus to move from distribution 3) to distribution 4) in order to minimize the deviation between the reference distribution REF and the distribution of the added power levels received by the station.

If the method is performed for a plurality of ground stations, it is possible to determine power thresholds Pmax, PO, PR and angular thresholds $\alpha r$, $\alpha o$ according to FIG. 3 for each of these ground stations, and then represent the maximum transmission powers of the non-geostationary satellite as a function of any point on Earth.

Figure 9:
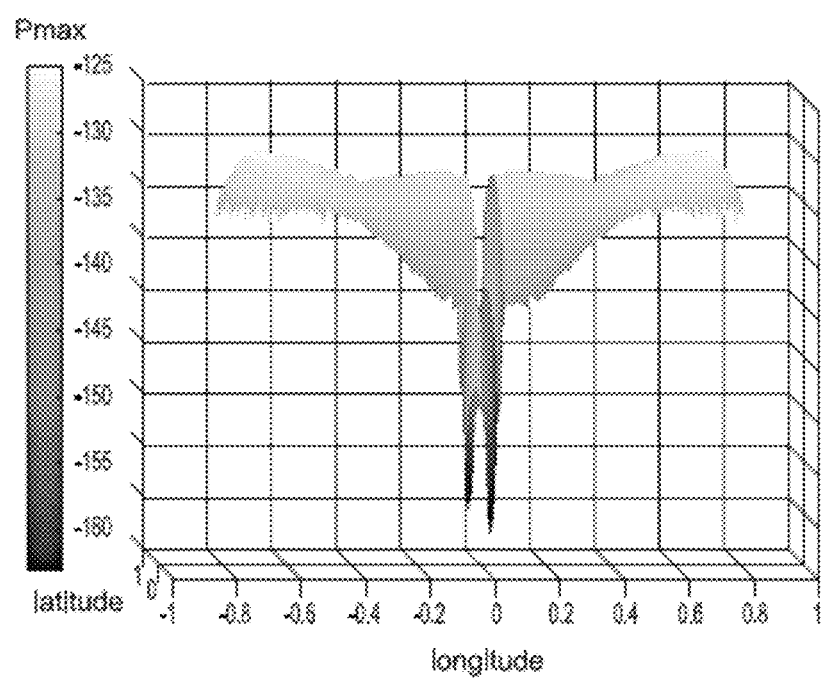
FIG. 9 shows a figure showing a profile of the power level received by a point on Earth as a function of the latitude and longitude of this point on Earth as obtained by the invention.

[FIG. 9] sets forth a figure showing the maximum transmission powers of a non-geostationary satellite as a function of any point on Earth, defined by its latitude and longitude. This figure is obtained by aggregating maximum transmission powers as a function of the angle $\alpha$, of the same type as that in FIG. 3, determined for a plurality of ground stations. The position of the point on Earth (or of the ground station) is located on the abscissa (longitude and latitude) and the maximum transmission power of the non-stationary satellite is given on the ordinate. It is thus possible to see in this figure that, for a point located close to the equator, the constellation is able to transmit only at a maximum level of $-160$ dB, whereas when approaching the poles it is able to transmit at a maximum power level of $-135$ dB.

The invention may be implemented as a computer program comprising instructions for the execution thereof. The computer program may be recorded on a recording medium able to be read by a processor. The medium may be electronic, magnetic, optical or electromagnetic.

The invention may in particular be implemented by a device comprising a processor and a memory. The processor may be a generic processor, a specific processor, an application-specific integrated circuit (ASIC) or a field-programmable gate array (FPGA).

The device may use one or more dedicated electronic circuits or a general-purpose circuit. The technique of the invention may be carried out on a reprogrammable calculation machine (a processor or a microcontroller for example) executing a program comprising a sequence of instructions, or on a dedicated calculation machine (for example a set of logic gates such as an FPGA or an ASIC, or any other hardware module).

According to one embodiment, the device comprises at least one computer-readable storage medium (RAM, ROM, EEPROM, flash memory or another memory technology, CD-ROM, DVD or another optical-disk medium, magnetic cassette, magnetic tape, computer-readable non-transitory storage disk) coded with a computer program (that is to say a plurality of executable instructions) that, when it is executed on a processor or a plurality of processors, performs the functions of the above-described embodiments of the invention.

By way of example of hardware architecture appropriate for implementing the invention, a device according to the invention may comprise a communication bus to which there are connected a central processing unit (CPU) or microprocessor, a read-only memory (ROM) being able to contain the programs necessary for implementing the invention; a random access memory (RAM) or cache memory containing registers suitable for recording variables and parameters that are created and modified during the execution of the abovementioned programs; and an I/O (input/output) or communication interface suitable for transmitting and for receiving data.

The reference to a computer program that, when it is executed, performs any one of the previously described functions is not limited to an application program running on a single host computer. On the contrary, the terms computer program and software are used here in a general sense to refer to any type of computer code (for example, application software, firmware, microcode, or any other form of computer instruction) that may be used to program one or more processors so as to implement aspects of the techniques described here. The computing means or resources may in particular be distributed (cloud computing), possibly using peer-to-peer technologies. The software code may be executed on any suitable processor (for example a microprocessor) or processor core or a set of processors, whether they are provided in a single computing device or distributed between several computing devices (for example such as possibly accessible in the environment of the device). The executable code of each program allowing the programmable device to implement the processes according to the invention may be stored for example in the hard disk or in read-only memory. Generally speaking, the program or programs may be loaded into one of the storage means of the device before being executed. The central unit is able to command and direct the execution of the instructions or software code portions of the program or programs according to the invention, which instructions are stored in the hard disk or in the read-only memory or else in the other abovementioned storage elements.

The invention claimed is:

1. A computer-implemented method for determining a maximum transmission power (Pmax, PR, PO) of a non-geostationary satellite (NGSO1, NGSO2) in the direction of a ground station (GSO_SOL), the method comprising the steps of:
   determining the minimum value of a topocentric angle ($\alpha$NGSO1, $\alpha$NGSO2), formed between the direction between the non-geostationary satellite and the ground station, on the one hand, and between the ground station and a point of the geostationary arc (ARC_GSO) corresponding to the orbit of a constellation of geostationary satellites (GSO), on the other hand;
   comparing, in terms of absolute value, the minimum value of the topocentric angle with at least two threshold values ($\alpha$r, $\alpha$o), such that:
   if said minimum value is less, in terms of absolute value, than the first threshold ($\alpha$r), defining the maximum transmission power of the non-geostationary satellite at a first value (PR),
   if said minimum value, in terms of absolute value, is between the first threshold and the second threshold ($\alpha$o), defining the maximum transmission power of the non-geostationary satellite at a second value (PO), greater than the first value,
   if said minimum value is greater, in terms of absolute value, than the second threshold, defining the maximum transmission power of the non-geostationary satellite at a third value (Pmax), greater than the second value;
   the first, the second and the third maximum transmission power value (PR, PO, Pmax), the first and the second threshold ($\alpha$r, $\alpha$o) being determined so as to minimize the deviation between a distribution of the power levels received by the ground station (GSO_SOL) and added over a time interval and a reference distribution (REF), the distribution of the received and added power levels being less than the reference distribution (REF).

2. The method for determining a maximum transmission power of a non-geostationary satellite according to claim 1, wherein the thresholds ($\alpha$r, $\alpha$o) and the power values (PR, PO, Pmax) are determined through the following steps:
   1) for a value of the first angular threshold ($\alpha$r) and for a value of the second angular threshold ($\alpha$o): simulating the power levels received by the ground station (GSO_SOL) and added over a time interval, comparing a distribution of the added power levels with the reference distribution (REF) and determining the value of the third power threshold (Pmax) so as to minimize the deviation between the reference distribution (REF) and the distribution of the added power levels;
   2) for the same first angular threshold value ($\alpha$r) in step 1) and for the third power threshold value (Pmax) determined in step 1): simulating, for a plurality of second angular threshold values ($\alpha$o), power levels received by the station (GSO_SOL) and added over a time interval, comparing a distribution of the added power levels with the reference distribution (REF) for each second angular threshold value and determining the value of the second angular threshold ($\alpha$o) from among the simulated values so as to minimize the deviation between the reference distribution (REF) and the distribution of the added power levels, and such that the difference between the second angular threshold ($\alpha$o) and the first angular threshold ($\alpha$r) is minimal.

3. The method for determining a maximum transmission power of a non-geostationary satellite according to claim 2, wherein steps 1) and 2) are repeated successively, the value of the first angular threshold ($\alpha$r) being different between each repetition, so as to obtain a triplet of values of the first threshold, of the second threshold and of the third power value ($\alpha$r, $\alpha$o, Pmax) at each repetition.

4. The method for determining a maximum transmission power of a non-geostationary satellite according to claim 3, comprising the following step executed after the repetition of steps 1) and 2):
   3) determining the triplet of values of the first threshold, of the second threshold and of the third power value ($\alpha$r, $\alpha$o, Pmax) from among the triplets obtained through the repetitions of steps 1) and 2) so as to comply with a criterion of a minimum quality of service provided by a non-geostationary system to which the non-geostationary satellite belongs.

5. The method for determining a maximum transmission power of a non-geostationary satellite according to claim 4, wherein step 3) comprises, for each triplet of values ($\alpha$r, $\alpha$o, Pmax) and for each instant of a time interval, determining non-geostationary satellites having a minimum topocentric angle value ($\alpha$, $\alpha$NGSO1, $\alpha$NGSO2) greater than the first threshold ($\alpha$r) of the triplet, and simulating the powers transmitted by these determined satellites to the ground station and the powers received by the ground station in order to determine a throughput received by the ground station at each instant and for each triplet so as to select one of the triplets of values ($\alpha$r, $\alpha$o, Pmax).

6. The method for determining a maximum transmission power of a non-geostationary satellite according to claim 5, wherein the determined triplet of values ($\alpha$r, $\alpha$o, Pmax) is the one in which the sum of the throughputs at each instant is highest.

7. The method for determining a maximum transmission power of a non-geostationary satellite according to claim 5, wherein the determined triplet of values ($\alpha$r, $\alpha$o, Pmax) is the one in which the throughput is at a maximum for a predetermined proportion of the time interval.

8. The method for determining a maximum transmission power of a non-geostationary satellite according to claim 4, comprising the following steps performed after step 3):

4) for each instant of the time interval, selecting non-geostationary satellites having a minimum topocentric angle value (a) greater than the first angular threshold ($\alpha r$);
5) simulating the power levels transmitted by the satellites selected in step 4) and received by the ground station added over the time interval;
6) identifying the instants of the time interval and adjusting the third maximum power value (Pmax) so as to minimize the deviation between a distribution of the power levels received by the ground station and added over the time interval and the reference distribution (REF), the reference distribution being greater than the added power levels.

9. The method for determining a maximum transmission power of a non-geostationary satellite according to claim 4, also comprising a refinement step comprising determining additional angular thresholds ($\alpha r\_1$, $\alpha o\_1$) and power thresholds (PR_1, PO_1) so as to reduce the deviation between the added power levels in step 3) and the reference level (REF), the added power levels being less than the reference level.

10. The method for determining a maximum transmission power of a non-geostationary satellite according to claim 1, wherein the method is implemented for a plurality of ground station position hypotheses.

11. The method for determining a maximum transmission power of a non-geostationary satellite according to claim 1, also comprising selecting at least one satellite of a constellation of non-geostationary satellites at each instant, the power levels received by the station resulting from signals transmitted by the selected satellites.

12. The method for determining a maximum transmission power of a non-geostationary satellite according to claim 11, wherein the selected satellite is the one having the highest power received by the ground station.

13. The method for determining a maximum transmission power of a non-geostationary satellite according to claim 11, wherein the selected satellite is the one located at the nadir of the ground station.

14. The method for determining a maximum transmission power of a non-geostationary satellite according to claim 13, comprising a step of correcting the first (PR), the second (PO) and the third (Pmax) maximum transmission power values of a non-geostationary satellite of the constellation, located at a point different from the nadir of the ground station, such that the power received by the ground station from this satellite of the constellation is equal to the power received by the ground station from the selected satellite located at the nadir.

15. A system comprising a computer program instructions for executing the method for determining a maximum transmission power of a non-geostationary satellite according to claim 1 when the program is executed by a processor.

16. A non-transitory storage medium on which there is recorded a program comprising instructions for executing the method for determining a maximum transmission power of a non-geostationary satellite according to claim 1, when the program is executed by a processor.

* * * * *